United States Patent [19]

van Basshuysen et al.

[11] Patent Number: 5,009,200
[45] Date of Patent: Apr. 23, 1991

[54] INTAKE MANIFOLD ASSEMBLY FOR A MULTICYLINDER INTERNAL COMBUSTION ENGINE

[75] Inventors: Richard van Basshuysen, Bad Wimpfen; Armin Bauder, Neckarsulm, both of Fed. Rep. of Germany

[73] Assignee: Audi AG, Ingolstadt, Fed. Rep. of Germany

[21] Appl. No.: 495,287

[22] Filed: Mar. 16, 1990

[30] Foreign Application Priority Data

Mar. 25, 1989 [DE] Fed. Rep. of Germany ....... 3909837

[51] Int. Cl.⁵ .............................................. F02M 35/10
[52] U.S. Cl. .................................... 123/52 M; 123/432
[58] Field of Search ......... 123/52 M, 52 MB, 52 MC, 123/52 MF, 52 ML, 432, 52 MV

[56] References Cited

U.S. PATENT DOCUMENTS

| | | | |
|---|---|---|---|
| 4,627,400 | 12/1986 | Takata et al. | 123/432 |
| 4,726,343 | 2/1988 | Kruger | 123/52 M |
| 4,765,297 | 8/1988 | Richter | 123/432 |
| 4,860,709 | 8/1989 | Clarke et al. | 123/432 |
| 4,877,004 | 10/1989 | Nishizawa | 123/432 |

FOREIGN PATENT DOCUMENTS

| | | | |
|---|---|---|---|
| 0122314 | 7/1983 | Japan | 123/52 MB |
| 0090720 | 5/1984 | Japan | 123/432 |
| 0088862 | 5/1985 | Japan | 123/52 MB |
| 0048919 | 3/1987 | Japan | 123/52 M |
| 0105230 | 5/1988 | Japan | 123/52 M |

*Primary Examiner*—David A. Okonsky
*Attorney, Agent, or Firm*—Kane, Dalsimer, Sullivan, Kurucz, Levy, Eisele and Richard

[57] ABSTRACT

In an intake manifold assembly for a multicylinder internal combustion engine with at least three inlet valves 4, 5, 6, to which lead individual intake manifolds 9, 10, 11 of different length, the shorter individual intake manifold of which 10, 11 can be put into operation, as the revolutions per minute and/or the load increases, by opening the shutoff valves 18, 19, the effective length of each individual intake manifold is shortened to the length of a shorter individual intake manifold, when the latter is put into operation, owing to the fact that appropriate intake ports 22, 24, 26 have been provided, which are controlled by control butterfly valves 23, 25, 27. Such an arrangement accomplishes that the resonating tube length of all individual intake manifolds, which have been put into operation, is the same, so that an optimum power output is ensured.

10 Claims, 3 Drawing Sheets

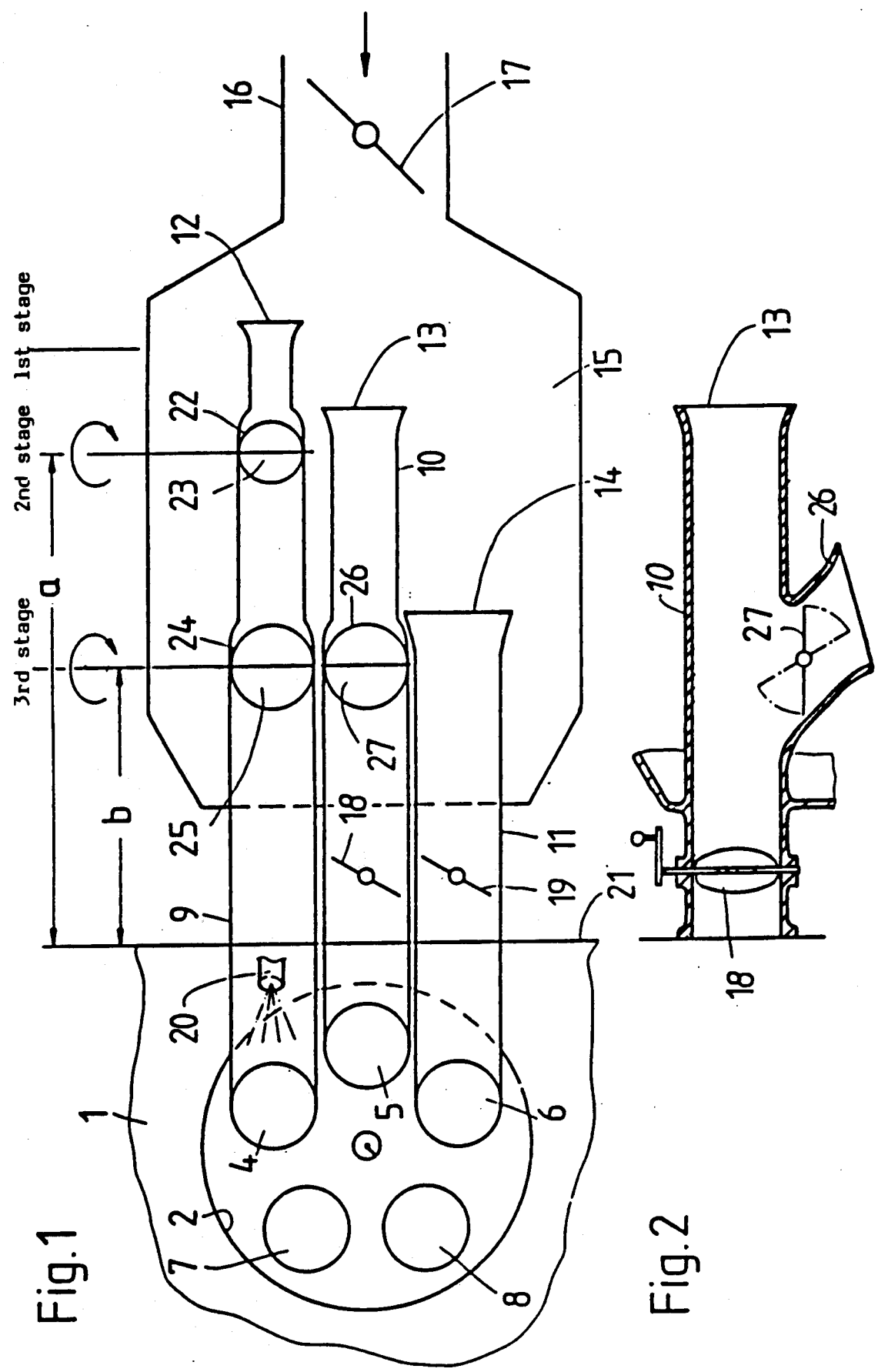

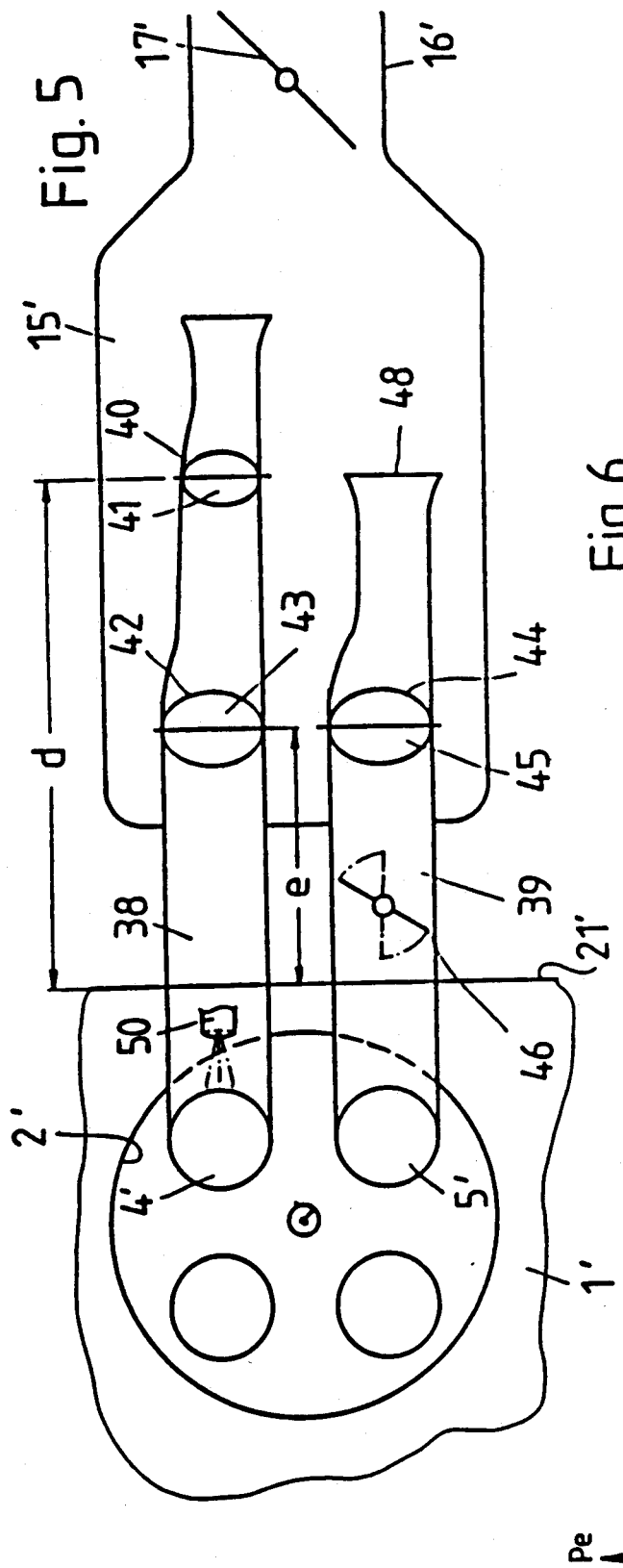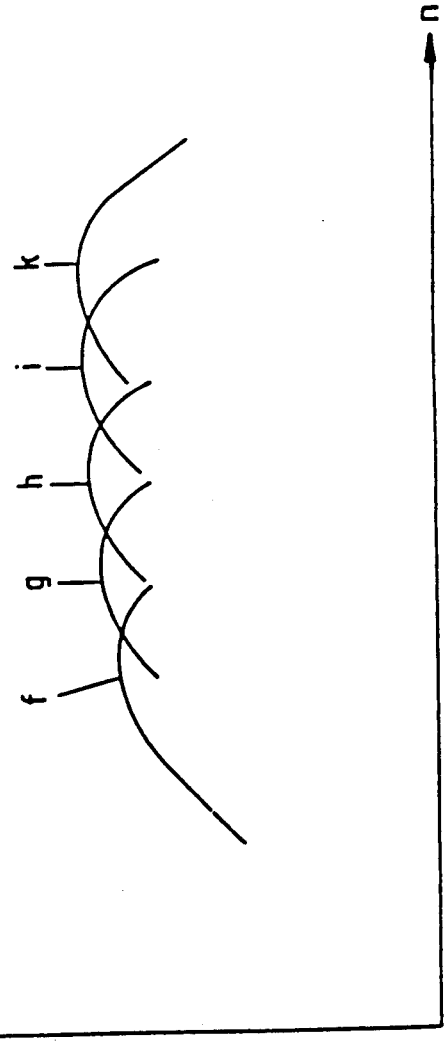

INTAKE MANIFOLD ASSEMBLY FOR A MULTICYLINDER INTERNAL COMBUSTION ENGINE

The invention relates to an intake manifold assembly for a multicylinder internal combustion engine with at least two inlet valves per cylinder and with longer and shorter individual intake manifolds, which in each case lead to their own inlet valve and the shorter intake manifold(s) of which can be put into operation as the revolutions per minute and/or the load increase(s) by opening a shutoff valve. Such an intake manifold assembly is disclosed in the German Auslegeschrift No. 3,633,509. By the disposal of individual intake manifolds of different lengths, it is possible to achieve a high torque in the lower range of revolutions per minute by blocking off the short intake manifold and a high power output by putting into operation the short individual intake manifold.

It is an object of the invention to provide an intake manifold assembly of the generic type, with which the volumetric efficiency and thus the output of the internal combustion engine can be increased significantly in the middle and upper range of the revolutions per minute.

Pursuant to the invention, this objective is accomplished owing to the fact that the effective length of each longer individual intake manifold is shortened to the length of the shorter individual intake manifold, when the latter is put into operation.

In the known intake manifold assembly, the effective length of the long individual intake manifold, which produces a high torque in the lower range of the revolutions per minute, remains unchanged also in the upper range of the revolutions per minute, in which the short individual intake manifold is put into operation and thus limits the volumetric efficiency. In contrast to this and pursuant to the invention, the same resonating conditions are created for all individual intake manifolds put in operation and thus an optimum volumetric efficiency is achieved by shortening the effective length of the longer individual intake manifold to the length of the shorter individual intake manifold, when the latter is put into operation. This effect can be intensified further if not only the lengths, but also the cross sections of the effective sections of the individual manifolds put into operation are essentially the same. In this connection, all the inlet valves, as is known, should preferably have the same diameter.

Shortening the effective length of each individual intake manifold can be accomplished in a simple manner owing to the fact that each longer individual intake manifold has at a distance from the cylinder head, which corresponds to the length of each shorter individual intake manifold, an intake port, which is controlled by a control butterfly valve, which can be actuated together with the shutoff valve assigned to the shorter individual intake manifold in question. At the junction of the intake port, the cross section of the individual intake manifold in question can be enlarged, so that its cross section from the intake port up to its end on the cylinder head side corresponds to the cross section of the shorter individual intake manifold. This change in cross section can be continuous or proceed in steps.

Preferably, the shutoff valves and the control butterfly valves are characteristics-controlled and, moreover, in such a manner that the putting into operation of a shorter individual manifold and the simultaneous shortening of the effective length of a longer individual intake manifold take place only when the middle range of the pressure, which is encompassed by the longer individual intake manifold or manifolds, is largely utilized. By these means, better preparation of the mixture is achieved due to the high flow speeds and consequently also an improvement in consumption and a reduction in pollutants in all operating ranges.

Further advantageous developments of the invention arise out of the dependent claims.

Some examples of the operation of the invention are described in the following with reference to the drawings, in which the following are shown.

FIG. 1 shows a diagrammatic representation of an intake manifold assembly for one cylinder of a multicylinder internal combustion engine.

FIG. 2 shows a longitudinal section through the middle individual intake manifold of FIG. 1.

FIG. 5 shows an intake manifold assembly for one cylinder with two inlet valves.

FIG. 6 shows a diagram similar to that of FIG. 3 for the intake manifold assembly of FIG. 5.

Figure 4:
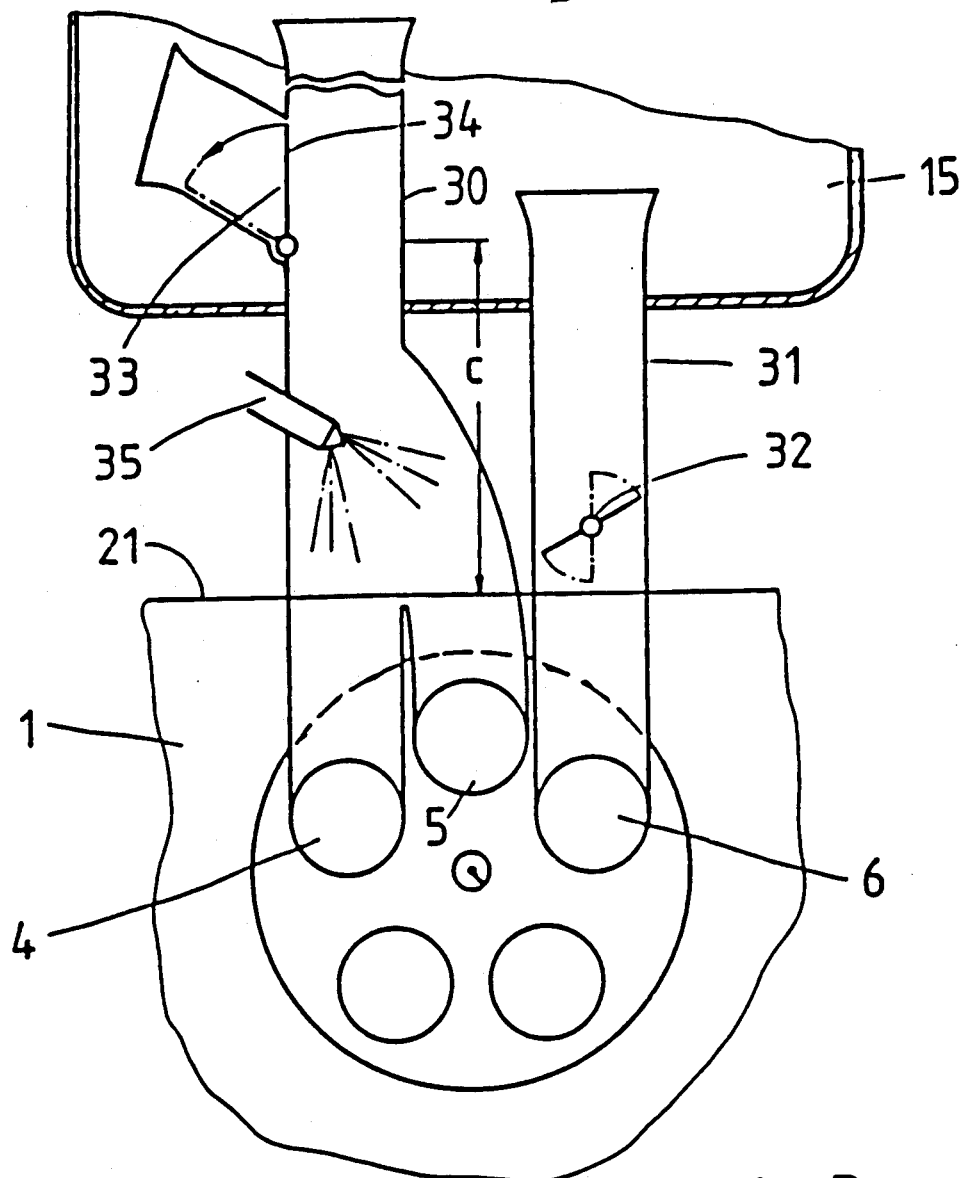
FIG. 4 shows a simplified intake manifold assembly for one cylinder with three inlet valves.

Reference is made first of all to FIG. 1, in which a partial view of a cylinder head 1 of a multicylinder internal combustion engine is shown. A combustion space 2 of a cylinder has three inlet valves 4, 5, 6 and two outlet valves 7 and 8. To the inlet valves 4, 5 and 6 lead individual intake manifolds 9, 10 and 11, the outlets 12, 13 of which lie in a common suction box 15, which is connected to an air inlet pipeline 16 with a butterfly valve 17, which can be operated randomly.

The individual intake manifold 9 for the first inlet valve 4 is designed to achieve a high torque in the lower range of revolutions per minute and is therefore relatively long. The individual intake manifold 10 for the second inlet valve 5 is shorter than the first individual intake manifold 9 and the third individual intake manifold 11 for the inlet valve 6 in turn is shorter than the second individual intake manifold 10. In the individual intake manifolds 10 and 11 shutoff valves 18 and 19 are provided near the cylinder head 1. The individual intake manifolds 10 and 11 can be put into operation consecutively as the revolutions per minute increase by means of these shutoff valves 18 and 19.

A fuel injection nozzle 20 is disposed in the individual intake manifold 9 or in the thereon adjoining inlet duct of the first inlet valve 4 and supplies the fuel requirements for the whole of the operating range of the internal combustion engine. Basically, it would, however, also be conceivable to provide each inlet duct with its own injection nozzle in the known manner.

In order to obtain a high volumetric efficiency in the middle and high range of the revolutions per minute, provisions have been made so that each longer individual intake manifold can be shortened to the length of the shorter individual intake manifold, when the latter is put into operation. For this purpose, the first individual intake manifold 9 is provided with a first intake port 22, which is controlled by a control butterfly valve 23, at a distance a from the flange surface 21 of the cylinder head 1 that corresponds to the length of the second individual intake manifold 10. A second intake port 24 is disposed in the first individual intake manifold 9 at a distance b from the flange surface 21 of the cylinder head 1 that corresponds to the length of the third individual intake manifold 11. The intake port 24 is controlled by a control butterfly valve 25. In an analogous manner, the second individual intake manifold 10 is provided at a distance b from the flange surface 21 of the cylinder head 1 with an intake port 26, which is controlled by a control butterfly valve 27. The connection of the intake port 26 to the second individual intake manifold 10 is shown in FIG. 2. The intake ports 22 and 24 are connected in an analogous manner with the first individual intake manifold 9.

In the lower range of the revolutions per minute of the internal combustion engine, the shutoff valves 18 and 19 are closed, so that only the first, long individual intake manifold 9 is working. By these means, a high torque is achieved in this range of the revolutions per minute. As the revolutions per minute increase, the shutoff valve 18 is opened and, with that, the second individual intake manifold 9 is put into operation. At the same time, the control butterfly valve 23 is opened, so that the effective length of the first individual intake manifold 9 is shortened to the length a of the second individual intake manifold 10. As the revolutions per minute increase further, also the shutoff valve 19 is opened and, by these means, the third individual intake manifold 11 is put into operation. At the same time, the control butterfly valves 25 and 27 are opened, as a result of which the effective length of the two first intake manifolds 9 and 10 is shortened to the length b of the third individual intake manifold 11. Since the control butterfly valves 25 and 27 are operated simultaneously, they can be disposed on a common shaft. The shutoff valves 18 and 19 and the control butterfly valves 23, 25 and 27 preferably have only one open and one closed position; preferably, however, they are dampened in order to lessen the impact. The output of the internal combustion engine is controlled in the usual manner by the butterfly valve 17.

In addition to shortening the longer individual intake manifolds when the shorter individual intake manifolds are put into operation, provisions are also made in the example of the operation of FIG. 1 to change the cross sections of the longer individual intake manifolds. As can be seen, the cross section of the first individual intake manifold 9 between the intake ports 22 and 24 is increased to the cross section of the second individual intake manifold 10 between the outlet 13 of the latter and the intake port 26. Correspondingly, the sections of the intake manifolds 9 and 10 between the intake ports 24 or 26 respectively and the flange surface 21 of the cylinder head 1 are enlarged to the cross section of the third individual intake manifold 11. By these means, the same conditions, that is the same resonating tube length and the same flow resistance will exist in all the individual intake manifolds in operation.

Figure 3:
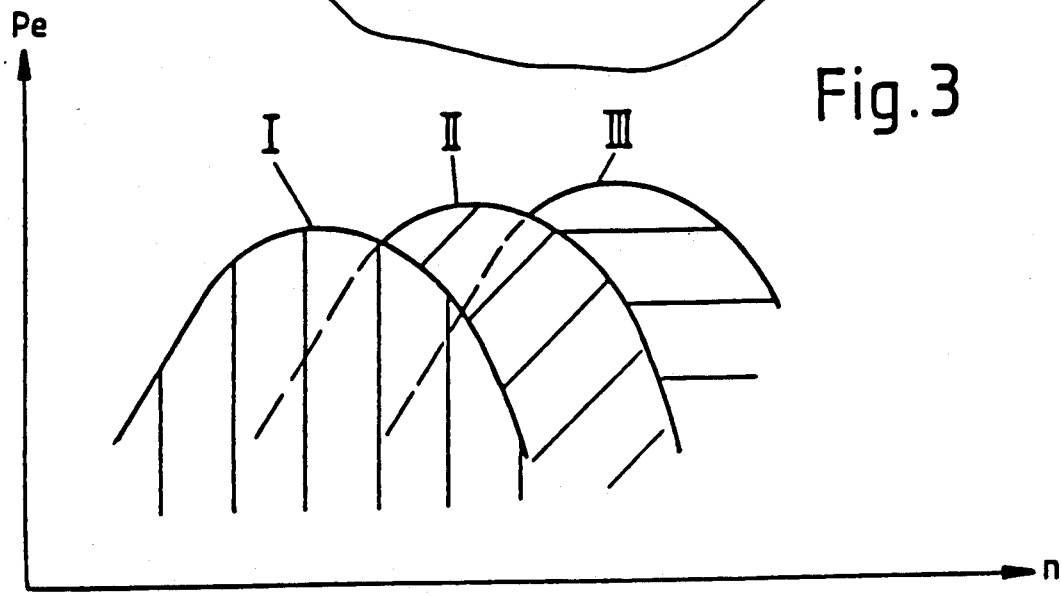
FIG. 3 shows a diagram, in which $P_e$ is plotted as a function of the revolutions per minute; the $P_e$ values are obtained by putting into operation consecutively the individual intake manifolds of FIG. 1.

The diagram presented in FIG. 3 shows the $P_e$ as a function of the revolutions per minute, which can be achieved with the manifold assembly of FIG. 1. In this diagram I. shows the variation in $P_e$ in the first step, that is, with the individual intake manifolds 10 and 11 shut off.

II. shows the variation in $P_e$ in the second step, that is, when shutoff valve 18 and control butterfly valve 23 are opened.

III. shows the variation in $P_e$ in the third step, that is, when shutoff valve 19 and control butterfly valves 25 and 27 as well are opened.

As can be seen, there is a high mean pressure and a corresponding high torque over the whole range of the revolutions per minute. The shutoff valves 18 and 19 and the control butterfly valves 23, 25 and 27 preferably are characteristics-controlled and, moreover, in such a manner, that the putting into operation of a shorter individual intake manifold and the simultaneous corresponding shortening of the longer individual intake manifold or manifolds takes place only when the average pressure range, which is encompassed by the longer individual intake manifold or manifolds, is largely exploited. In FIG. 3, the average pressure range, which is encompassed by the first individual intake manifold 9, is shaded vertically, the average pressure range, which is encompassed additionally by the putting into operation of the second individual intake manifold 10 is shaded obliquely and the average pressure range, which is encompassed additionally by the putting into operation of the third individual intake manifold 11, is shaded horizontally.

In the example of the operation of FIG. 4 only two individual intake manifolds 30 and 31 are provided for an internal combustion engine with three inlet valves 4, 5 and 6 per cylinder. The first individual intake manifold 30 is relatively long, is designed for the lower and middle range of the revolutions per minute and is forked towards the two inlet valves 4 and 5. The second individual intake manifold 31 is relatively short and constructed for high power outputs in the upper range of the revolutions per minute and leads to the third inlet valve 6. It contains a shutoff valve 32, with which it is put into operation when the revolutions per minute reach a particular value. In principle, as in the case of the previous example, the first individual intake manifold 30, at a distance c from the flange surface 21 of the cylinder head 1 that corresponds to the length of the second individual intake manifold 31, has an intake port 33, which is controlled by a control butterfly valve 34. When the revolutions per minute reach a certain value, this control butterfly valve 34 is opened together with the shutoff valve 32 in order to obtain the same resonating tube lengths for the intake paths of all three inlet valves 4, 5 and 6. In this case, an injection nozzle 35 can be disposed so that it injects the fuel into the intake ducts of both valves 4 and 5. A further injection nozzle can also be disposed in the individual intake manifold 31. Aspiration takes place as in the first example of the operation from the common suction box 15.

In FIG. 5, an intake manifold assembly for a cylinder 2' with two inlet valves 4' and 5' is shown, which has a long, first individual intake manifold 38 leading to the inlet valve 4' and a short, second individual intake manifold 39 leading to the second inlet valve 5'. Both individual intake manifolds 38 and 39 aspirate, as in the previous examples, from a common suction box 15', which is connected to an air inlet line 16' with butterfly valve 17', which can be operated randomly.

The length of the first individual intake manifold 38 is designed to achieve a high torque in the low range of the revolutions per minute. This individual intake manifold 38 has two intake ports 40 and 42, which are controlled by shutoff valves 41 and 43. The first intake port 40 is disposed at a distance d from the flange surface 21' of the cylinder head 1' that corresponds to the length of the second individual intake manifold 39. The second intake port 42 is disposed at such a distance from the flange surface 21' of the cylinder head 1 that, when the control butterfly valve 43 is opened, a high power output is achieved in the upper range of the revolutions per minute. The second individual intake manifold 39 is provided at the same distance with an intake port 44, which is controlled by a control butterfly valve 45. In addition, a shutoff valve 46 is provided in the second individual intake manifold 39 near the flange surface 21.

By appropriately controlling butterfly valves 41, 43, 45 and 46, an almost constant, effective average pressure is achieved over a very wide range of revolutions per minute. In the lower range of revolutions per minute, all control butterfly valves 41, 43, 45 and 46 are closed, so that only the first individual intake manifold 38 is effective with its whole length. When the revolutions per minute reach a certain value, the control butterfly valve 41 is opened, so that the effective length of the individual intake manifold 38 now corresponds to the distance d. To increase the power, shutoff valve 46 can now be opened, as a result of which the second individual intake manifold 39 is now put into operation. As a next step, one of the control butterfly valves 43 or 45 can be opened, so that the resonating tube length of the individual intake manifold in question, 38 or 39, is reduced to the value e and the power output is increased. As a next step, the second control butterfly valve 45 or 43 is also opened, so that the resonating tube length of both individual intake manifolds 38 and 39 is reduced to the value e and the greatest possible output of power is achieved. Obviously, the amount of fuel injected by the injection nozzle 50 into the intake duct of the first inlet valve 4' must be adapted to the total amount of air aspirated.

As can be seen the cross sections of the individual intake manifolds are constructed differently over their length in this Example and, moreover, in such a manner, that the effective sections of the two individual intake manifolds have not only the same length, but also the same cross section. For example, the cross section of the individual intake manifold 38 increases between the intake ports 40 and 42 to the cross section of the second individual intake manifold 39 between its outlet 48 and the intake port 44. In a similar manner, the cross section of the first individual intake manifold 38 increases in the flow direction behind the second intake port 42 to the cross section of the second individual intake manifold 39 between the intake port 44 and the flange surface 21' of the cylinder head 1'.

The variation in $P_e$ with the revolutions per minute, which can be realized with the structure of FIG. 5, is presented in FIG. 6, in which the following are shown:

Curve f represents the variation when only the individual intake manifold 38 is effective over the whole of its length.

Curve g represents the variation when the control butterfly valve 41 is opened.

Curve h represents the variation when also the shutoff valve 46 is opened.

Curve i represents the variation when also the control butterfly valve 43 is opened.

Curve k represents the variation when also the control butterfly valve 45 is opened.

The output of the internal combustion engine is adjusted as before in the customary manner by the butterfly valve 17'.

We claim:

1. An intake manifold assembly for a multicylinder internal combustion engine having at least two inlet valves per cylinder, said assembly comprising longer and shorter length individual intake manifolds for each cylinder, each said manifold serving a respective inlet valve, each said shorter intake manifold having a control valve therein, said assembly characterized in that the effective length of each said longer individual intake manifold can be shortened to the length of the shorter individual intake manifold serving the same cylinder when the control valve is open allowing flow through the shorter intake manifold.

2. The intake manifold assembly of claim 1, characterized in that the cross sectional area of effective sections of the individual intake manifolds that have been put into operation are essentially the same.

3. The intake manifold assemble of claim 1 or 2 characterized in that each said longer individual intake manifold has at a distance, corresponding to the length of each shorter individual intake manifold from the cylinder head, an intake port which is controlled by a control butterfly valve which can be actuated together with the control valve of the shorter individual intake manifold.

4. The intake manifold assembly of claim 3 characterized in that each said longer individual intake manifold has at said distance from the cylinder head corresponding to the length of the shorter individual intake manifold an enlargement in cross sectional area in the region of each said intake port.

5. The intake manifold assembly of claim 3 characterized in that the individual intake manifolds and intake ports originate in a common suction box which is connected to an air inlet pipeline with a control valve.

6. The intake manifold assembly of claim 1 having at least three inlet valves per cylinder, characterized in that
    (a) the shorter individual intake manifold leads to a first inlet valve,
    (b) a medium length individual intake manifold leads to a second inlet valve and has a first control valve therein, a second control valve at a distance from the cylinder head that corresponds to the length of the shorter individual intake manifold, an intake port that is controlled by the second control valve and has, in the defined section from the intake port to the cylinder head, essentially the same cross sectional area as the shorter individual intake manifold, the remaining section upstream of said defined section having a larger cross sectional area than said defined section, and
    (c) the longer individual manifold leads to the third inlet valve and at a first distance from the cylinder head corresponding to the length of the medium length individual intake manifold has a first intake port with a first control valve and, at a second distance from the cylinder head corresponding to the length of the shorter individual intake manifold has a second intake port with a second control valve such that in the section from the second intake port to the cylinder head the longer individual manifold has essentially the same cross sectional area as the shorter individual intake manifold, in the section between the first and second ports has essentially the same cross sectional area as the remaining section of the medium length individual intake manifold and, in the section from the upstream end to the first intake port has a smaller cross sectional area than in the two other sections.

7. The intake manifold assembly of claim 1 having at least three inlet valves per cylinder, characterized in that the longer individual intake manifold is forked to two inlet valves and the shorter individual intake manifold leads to the third inlet valve, the longer individual intake manifold, at a distance from the cylinder head corresponding to the length of the shorter individual intake manifold has a inlet port which is controlled by a control valve, and, downstream from the forking, an injection nozzle injects to the corresponding two inlet valves.

8. The intake manifold assembly of claim 7 characterized by
   (a) the shorter individual intake manifold, which leads to the first inlet valve, has the control valve disclose to its connection to the cylinder head and an intake port, said intake port being controlled by a second control valve between an upstream end of the manifold and the control valve, and
   (b) the longer individual intake manifold, which leads to the second inlet valve, has at a first distance from the cylinder head, which corresponds to the length of the shorter individual intake manifold, a first intake port, which is controlled by a first control valve and, at essentially the same distance from the cylinder head at which the intake port is provided in the shorter individual intake manifold, a second intake port with a second control valve, the cross sectional area of the manifold between the second intake port and the cylinder head being larger than the remaining upstream section cross-sectional area and essentially equal to the cross sectional area of the shorter individual intake manifold between the intake port of the shorter manifold and the cylinder head.

9. The intake manifold assembly of claim 6, characterized in that the second control valves, which are disposed in the intake ports of the medium length and longer length individual intake manifolds and are disposed at the same distance from the cylinder head, are seated on a common shaft.

10. The intake manifold assembly of claim 1 characterized in that the control valve is controlled in such a manner, that the putting into operation of the shorter individual intake manifold takes place only when the average pressure range encompassed by the longer individual intake manifold is largely utilized.

* * * * *